Patented Mar. 13, 1945

2,371,314

UNITED STATES PATENT OFFICE 2,371,314

HEAT SEALABLE WAXED WRAPPING SHEET AND PROCESS OF MANUFACTURE

Cecil M. Rhodes, St. Paul, and Harold W. Wendorf, Minneapolis, Minn., assignors to Rapinwax Paper Company, Minneapolis, Minn., a corporation of Minnesota No Drawing. Application November 14, 1941, Serial No. 419,086

14 Claims. (Cl. 154—42)

Our invention relates to the manufacture of wax paper wrappers, such as bread wrappers, which would become adhesive under sealing heat.

This application is a continuation in part of our previous application, Serial Number 254,684, filed February 4, 1939.

An object of the invention is to use a hard wax coating which has the quality of having high gloss, is non-smeary, and is not easily marred, but is in itself not particularly well adapted for sealing under heat. This coating is relatively low in heat sealing qualities in comparison with soft plastic waxes which are commonly used for such coatings. It is an object of our invention to make such a hard wax surface effectively adhesive under the influence of a sealing heat.

It has been customary to apply to wrappers, such as bread wrappers, and the like, a coating of soft wax, such as paraffin. This coating forms a moistureproof covering for the paper which brings about an adherence between overlapped portions of the papers when these overlapped portions are sealed by heat and pressure. Such a paraffin coating is satisfactory as to moistureproofness, but has several disadvantages in use. Such a soft coating has a tendency to smear and is possessed of a soft finish which is not particularly glossy. Furthermore such a paraffin coating is not particularly effective in its adhesive properties.

Attempts have been made to use hard waxes, such as carnauba wax, in preparing coatings. Such coatings formed of hard wax are usually relatively brittle as compared to the softer wax coatings. Therefore, while making a high gloss covering which is resistant to smearing and which is extremely transparent, such a coating is ineffective in its heat sealing qualities.

We have found that with the use of a thin coating of ethyl cellulose underneath the hard wax coating and not admixed with the ethyl cellulose, an extremely desirable coating is provided. The hard wax coating is unaffected until heat is applied but when the heat is employed the ethyl cellulose is absorbed by the wax, toughening the wax coating and removing its qualities of brittleness. Thus upon the application of heat the two separate coatings combine together to form a single fused coating which is more effectively adhesive than either the hard outer coating or the ethyl cellulose coating when used alone. Furthermore this fused coating formed by the application of heat is more effectively adhesive than the smeary and easily marred soft wax coating which is ordinarily used.

We are familiar with the fact that a plurality of layers of coatings have previously been used for various purposes on a base sheet which may be used as a wrapper. These previous coatings, however, are not arranged to fuse together upon application of heat so as to provide a single coating having adhesive properties superior to that of either of the coatings alone. In some instances a coating of thermoplastic material is applied to permit the heat sealing of coated papers which otherwise would be low in heat sealing qualities. It is our intention in the present invention, however, to provide separate coatings which are fusible at heat sealing temperatures to produce an extremely effective bond and we have found that our coatings combine in this manner to produce a single highly efficient bond.

Other objects and advantages reside in the particular structure of our invention and the combination and arrangement of the portions thereof, and in the particular methods of forming and applying the same, all of which will be readily apparent to those skilled in the art, upon reference to the following detailed description forming a part of this specification.

In the art of packaging food, particularly perishable food, such as bread, wherein it is desired to provide an attractive package including a transparent wrapper which is moistureproof and air-proof, great difficulty has been experienced in providing means for efficiently sealing the overlapped edges of the wrapper without sacrificing the transparency of the paper or lowering the strength of the seal below the desirable level. We may define an effective seal as one requiring a force of at least 10 grams per linear inch to pull the same apart. Force may best be measured by attaching one strip to a device which indicates the pull, while the unsealed end of the other strip is held in the hand and slowly pulled away until the bond is ruptured. Several tests should be made to provide a good average value. Sealing the large sealing areas of food wrappers by application of heat has been recognized as one of the most, if not the most, desirable ways of forming such seals. In this connection paper coated with paraffin has been found to form a fairly satisfactory, although somewhat improper seal, but such a paraffin coating is objectionable in that the paraffin is not hard and resistant to handling. As a result the transparency of the paper is reduced by handling even where glassine or other transparent base sheets are used. Furthermore paraffin does not give an extremely glossy and stable finish to the wrapper.

We have found that carnauba wax provides a coating which is possessed of high gloss and is resistant to smearing and can be made into a highly transparent coating. Other hard waxes and blends of waxes are known which are transparent and which will give a hard glossy and transparent finish to the sheet although the use of carnauba wax is preferred. These hard waxes and blends thereof can not ordinarily be used to form heat sealing coatings for wrappers because they are deficient in sealing strength. Typical blended wax coatings falling into this classification are as follows:

|  | Percent |
|---|---|
| I. Albacer wax | 40 |
| Carnauba wax (refined) | 40 |
| Bodie-Hoover 121 wax | 20 |
| II. Albacer wax | 33⅓ |
| Opalwax No. 10 | 33⅓ |
| Bodie-Hoover 121 wax | 33⅓ |
| III. Opalwax No. 10 | 50 |
| Ester gum | 25 |
| Paraffin | 25 |

Albacer wax is a hard wax manufactured by the Glyco Products Company. This wax is a white opaque solid wax and comprises a hydrogenated polyhydric alcohol ester of vegetable oils. This wax has a melting point of 95–97 degrees C., is insoluble in water, and is soluble in hot hydrocarbon solvents.

Bodie-Hoover 121 wax is a wax manufactured by the Bodie-Hoover Petroleum Company and is a white or cream colored solid wax composition comprising hydrogenated dihydroxy acid and saturated hydrocarbons. This wax has a melting point A. S. T. M. D-87-22 method 161 degrees F. It has a saponification number of 57, specific gravity of 0.936, and iodine number of 9.89, is insoluble in water and soluble in hot solvents such as naphtha, alcohol, and turpentine. Penetration test at 77 degrees F. and 100 grams for 5 seconds—2.0.

Opalwax No. 10 is a synthetic hard wax composed essentially of hydrogenated castor oil.

Carnauba wax is made of the Brazilian wax palm and is well known.

Ester gum is a well known composition.

To overcome the deficiency in the sealing strength of the above waxes, blends thereof, and the like, waxes and blends of waxes, we have devised the invention hereinafter disclosed. We have found that the deficiency in sealing strength of a hard glossy and transparent wax or blend of waxes may be overcome without the sacrificing of any of the named qualities of the wax or blend, if a coating of such wax is applied to a wrapper sheet which has been first coated with a very thin transparent film of ethyl cellulose. Then, when the sheet is heat sealed the sealing qualities of the wax or blend will be raised from below a rupture point at a pull of 10 grams per linear inch to a strength sufficient to resist a pull of between 30 and 180 grams per linear inch. Moreover our sealing coating requires considerably less wax than would be the case where paraffin alone is used. For instance on ordinary light weight tissue paper ranging from 8 to 30 pounds per 3,000 square feet, a surface coating of from 2 to 5 pounds of paraffin per one side of a sheet having 3,000 square feet is necessary to make the sheet self-sealing under heat and to provide an adequate sealing that is on an 8 pound sheet. Two pounds of paraffin is required per side and five pounds per side is required on a thirty pound sheet of like size.

On glassine paper of proper manufacture for self-sealing work, a sheet weighing 20 pounds per 3,000 square feet requires about 2 pounds of paraffin per side for insuring adequate sealing on automatic wrapping machines for such items as sliced bread. Such a sheet has a sealing strength of not more than 20 grams per linear inch.

We prefer to use properly made glassine paper as a base sheet because this material is transparent and has other desirable characteristics. However, any sulfite or other fibrous paper suitable for sealing may be used.

We have found that to make such a twenty pound sheet of glassine paper self-sealing with the above described hard, glossy, and transparent waxes, or blends of such, only one or two pounds of wax or blended wax per 3,000 square feet of surface is necessary. This coating is applied over a coating of about 0.7 pound per 3,000 square feet of surface of ethyl cellulose. The resulting sheet will not only be more completely transparent as compared to the partial transparency of the paraffin coated sheet, but will have a sealing strength of some 30 to 180 grams per linear inch.

We have found moreover that a surface coating of as little as 0.25 pound of ethyl cellulose per 3,000 square feet of surface will suffice to provide a marked increase in the sealing strength of hard, glossy, transparent waxes and blends thereof. Moreover, a coating of ethyl cellulose of more than 0.7 pound per 3,000 square feet of such a sheet may be desirable under given circumstances. However, experience has proven that a coating of ethyl cellulose of about 0.7 pound per 3,000 square feet of surface is most desirable for our purpose.

Our preferred method of forming the sheet and of applying the ethyl cellulose to the sheet comprises dissolving the ethyl cellulose in a solution comprising 80% toluene and 20% denatured alcohol and this solution is applied to the sheet in any suitable manner and the solvent is driven off to leave a very thin and even coating of the ethyl cellulose. Other solvent solutions may, of course, be used, then when the ethyl cellulose has dried the coating of wax or blended wax is applied thereover in any suitable manner and by any suitable means.

Besides the above described coating of ethyl cellulose alone, we have found that the ethyl cellulose may be blended with plasticizing materials, such as dibutyl phthalate, linseed oil, cottonseed oil, Nevillite oil, Aroclor 1254, or any of the common liquid plasticizers compatible with ethyl cellulose, and still retain its effectiveness in developing sealing strength in the superimposed wax coatings, heretofore described.

Typical examples of solutions which may be used to coat glassine paper with 0.7 pound solids per ream and which will provide a seal having high sealing strength, are as follows:

| I. Ethyl cellulose | 4 parts | 20% |
|---|---|---|
| Aroclor 1254 | 1 part | |
| Toluene | 4 parts | 80% |
| Alcohol | 1 part | |
| II. Ethyl cellulose | 1 part | 25% |
| Cottonseed oil | 1 part | |
| Toluene | 4 parts | 75% |
| Alcohol | 1 part | |
| III. Ethyl cellulose | 10 parts | 25% |
| Nevillite oil | 6 parts | |
| Toluene | 80% | 75% |
| Alcohol | 20% | |

Aroclor 1254 is a viscous resin-like plasticizer composed of chlorinated diphenyl. Cottonseed oil is a plasticizer oil. Toluene and alcohol are solvents. Nevillite oil is manufactured by the Neville Company of Pittsburgh, Pennsylvania, and is composed essentially of hydrogenated di-indene, produced by distillation and hydrogenation of by-product acids accumulated during the distillation of coumarone-indene type resins. This is a heavy viscous oil of water white color. Its specific gravity is 0.950, and boiling range 300–350 degrees C. It has an iodine number of 2.0 and acid value of less than 0.1. The molecular weight is approximately 250, and the product is tasteless and odorless at room temperatures.

While we have shown and described what is now believed to be the preferred forms of our invention it is to be understood that such disclosure is illustrative only and that we do not limit ourselves to the compounds named except as defined in the claims.

It is important that the two layers, ethyl cellulose (or ethyl cellulose and a plasticizer) and wax remain separate and are not admixed until the application of heat to form the seal. This can be accomplished by applying the wax layers in any known manner which will not cause admixture between the wax layers. There is formed thereby a sheet which is non-tacky and which may be readily stored, packed and handled without damage.

In carrying out our invention, the proportioning of the thin cellulose layer with a relatively thick hard wax overlayer as set forth is of material importance.

When heat is applied to form the seal the wax softens, becomes admixed with the ethyl cellulose layer and forms an adhesive mixture having a relatively high sealing strength. Thus our coating comprises two layers which are not dependent upon each other and which are not admixed in any way until the sealing heat is applied, but which then, and only then, becomes admixed and form a sealing mixture.

In accordance with the patent statutes, we have described the principles of our combination, and while we have endeavored to set forth the best embodiments thereof, we desire to have it understood that obvious changes may be made within the scope of the following claims without departing from the spirit of our invention.

We claim:

1. The method of heat sealing a flexible transparent sheet to the surface of the same or similar material which comprises, applying a solution having as an ingredient thereof ethyl cellulose to one side of the sheet, evaporating the solvent of said solution to form a substantially even coating thereon, applying a substantially even separate coating of hard wax capable when heated of dissolving ethyl cellulose and of a hardness substantially equal to that of carnauba wax upon said first coating, maintaining the two coatings normally substantially unintermixed, bringing the surface to be sealed in contact with said hard wax coating, and applying sufficient heat to fuse the said first coating and hard wax coating to form an adhesive to accomplish the sealing.

2. The method of heat sealing a flexible transparent sheet to the surface of the same or similar material which comprises, applying a solution of ethyl cellulose to one side of said sheet, evaporating the solvent of said solution to form a substantially even coating of ethyl cellulose thereon, ranging in weight from approximately 0.25 pound to 1.0 pound of ethyl cellulose per 3,000 square feet of said sheet, applying a substantially even separate coating of wax capable when heated of dissolving ethyl cellulose and of a hardness substantially equal to or greater than that of carnauba wax upon the coating of ethyl cellulose wherein the hard wax coating ranges in weight from approximately 1 pound to 2 pounds per 3,000 square feet of said sheet, maintaining the two coatings normally substantially unintermixed bringing the surface to be sealed in contact with the said hard wax coating, and applying sufficient heat to fuse the said coating of ethyl cellulose with the coating of hard wax to accomplish the sealing.

3. The method of heat sealing a sheet of flexible transparent material to an overlapping edge of the said material which comprises, applying a solution comprised of ethyl cellulose and a plasticizer, evaporating the solvent of said solution to form a substantially even coating thereon, applying a substantially even separate coating of hard wax capable when heated of dissolving ethyl cellulose and of a hardness substantially equal to that of carnauba wax upon said first coating, maintaining the two coatings normally substantially unintermixed bringing the overlapping edge to be sealed in contact with the said hard wax coating, and applying sufficient heat to fuse the said first coating and hard wax coating to accomplish the sealing.

4. The method of heat sealing a flexible transparent wrapping sheet to an overlapping edge of the said material which comprises, applying a solution comprised of ethyl cellulose and dibutyl phthalate, evaporating the solvent of said solution to form a substantially even coating thereon, applying a substantially even separate coating of hard wax capable when heated of dissolving ethyl cellulose and of a hardness substantially equal to that of carnauba upon said first coating, maintaining the two coatings normally substantially unintermixed bringing the overlapping edge to be sealed in contact with the said hard wax coating, and applying sufficient heat to fuse the said first coating and hard wax coating to accomplish the sealing.

5. The method of heat sealing a sheet of flexible transparent wrapping material to an overlapping edge of the sheet material which comprises, applying a solution comprised of ethyl cellulose and a plasticizer selected from the group consisting of linseed oil, cottonseed oil, and Nevillite oil, to one side of said sheet, evaporating the solvent of said solution to form a substantially even coating thereon, applying a substantially even separate coating of hard wax capable when heated of dissolving ethyl cellulose and of a hardness substantially equal to that of carnauba wax upon said first coating, maintaining the two coatings normally substantially unintermixed bringing the overlapping edge to be sealed in contact with the hard wax coating, and applying sufficient heat to fuse the said first coating and hard wax coating to accomplish the sealing.

6. The method of heat sealing a sheet of flexible transparent wrapping material to an overlapping edge of the sheet material which comprises, applying a solution comprised of ethyl cellulose to one side of said sheet, evaporating the solvent of said solution to form a substantially even coating thereon, applying a substantially even separate coating of carnauba wax upon said first coating, maintaining the two coatings normally substantially unintermixed bringing the overlapping edge to be sealed in contact with the said hard wax coating, and applying sufficient heat to fuse the first coating and hard wax coating to accomplish the sealing.

7. As a new article a heat sealing wrapping sheet of flexible transparent material, a substantially even coating having ethyl cellulose as an essential ingredient on at least one side of said sheet, and a separate relatively thicker substantially even coating of hard wax superimposed on said first coating and substantially unintermixed therewith and ranging in weight from approximately one pound to two pounds per 3,000 square feet of said sheet.

8. The method of heat sealing a glassine sheet to the surface of the same or similar material which comprises, applying a solution having as an ingredient thereof ethyl cellulose to one side of the sheet, evaporating the solvent of said solution to form a substantially even coating thereon, applying a substantially even separate coating of hard wax capable when heated of dissolving ethyl cellulose and of a hardness substantially equal to that of carnauba wax upon said first coating, maintaining the two coatings normally substantially unintermixed bringing the surface to be sealed in contact with said hard wax coating, and applying sufficient heat to fuse the said first coating and hard wax coating to form an adhesive to accomplish the sealing.

9. The method of heat sealing a glassine sheet to the surface of the same or similar material which comprises, applying a solution of ethyl cellulose to one side of said sheet, evaporating the solvent of said solution to form a substantially even coating of ethyl cellulose thereon, ranging in weight from approximately 0.25 pound to 1.0 pound of ethyl cellulose per 3,000 square feet of said sheet, applying a substantially even separate coating of wax capable when heated of dissolving ethyl cellulose and of a hardness substantially equal to or greater than that of carnauba wax upon the coating of ethyl cellulose wherein the hard wax coating ranges in weight from approximately 1 pound to 2 pounds per square foot of said sheet, maintaining the two coatings normally substantially unintermixed bringing the surface to be sealed in contact with the said hard wax coating, and applying sufficient heat to fuse the said coating of ethyl cellulose with the coating of hard wax to accomplish the sealing.

10. The method of heat sealing a glassine sheet to an overlapping edge of the said material which comprises, applying a solution comprised of ethyl cellulose and a plasticizer, evaporating the solvent of said solution to form a substantially even coating thereon, applying a substantially even separate coating of hard wax capable when heated of dissolving ethyl cellulose and of a hardness substantially equal to that of carnauba wax upon said first coating, maintaining the two coatings normally substantially unintermixed bringing the overlapping edge to be sealed in contact with the said hard wax coating, and applying sufficient heat to fuse the said first coating and hard wax coating to accomplish the sealing.

11. The method of heat sealing a glassine sheet to an overlapping edge of the said material which comprises, applying a solution comprised of ethyl cellulose and dibutyl phthalate, evaporating the solvent of said solution to form a substantially even coating thereon, applying a substantially even separate coating of hard wax capable when heated of dissolving ethyl cellulose and of a hardness substantially equal to that of carnauba wax upon said first coating, maintaining the two coatings normally substantially unintermixed bringing the overlapping edge to be sealed in contact with the said hard wax coating, and applying sufficient heat to fuse the said first coating and hard wax coating to accomplish the sealing.

12. The method of heat sealing a glassine sheet to an overlapping edge of the sheet material which comprises, applying a solution comprised of ethyl cellulose and a plasticizer selected from the group consisting of linseed oil, cottonseed oil, and Nevillite oil, to one side of said sheet, evaporating the solvent of said solution to form a substantially even coating thereon, applying a substantially even separate coating of hard wax capable when heated of dissolving ethyl cellulose and of a hardness substantially equal to that of carnauba wax upon said first coating, maintaining the two coatings normally substantially unintermixed bringing the overlapping edge to be sealed in contact with the hard wax coating, and applying sufficient heat to fuse the said first coating and hard wax coating to accomplish the sealing.

13. The method of heat sealing a sheet of glassine to an overlapping edge of the sheet material which comprises, applying a solution comprised of ethyl cellulose to one side of said sheet, evaporating the solvent of said solution to form a substantially even coating thereon, applying a substantially even separate coating of carnauba wax upon said first coating, maintaining the two coatings normally substantially unintermixed bringing the overlapping edge to be sealed in contact with the said hard wax coating and applying sufficient heat to fuse the first coating and hard wax coating to accomplish the sealing.

14. As a new article a heat sealing wrapping sheet of glassine, a substantially even coating having ethyl cellulose as an essential ingredient on at least one side of said sheet, and a separate relatively thicker substantially even coating of hard wax superimposed on said first coating and substantially unintermixed therewith and ranging in weight from approximately one pound to two pounds per 3,000 square feet of said sheet.

CECIL M. RHODES.
HAROLD W. WENDORF.